United States Patent [19]

Pirker et al.

[11] 3,977,635

[45] Aug. 31, 1976

[54] RAILWAY SWITCH FOR VIGNOLES RAILS

[75] Inventors: Robert Pirker, Zeltweg; Hannes Lindner, Leobem, both of Austria

[73] Assignee: Vereinigte Osterreichische Eisen- und Stahlwerke-Alpine Montan Aktiengesellschaft, Vienna, Austria

[22] Filed: June 5, 1975

[21] Appl. No.: 584,199

[30] Foreign Application Priority Data

Oct. 15, 1974 Austria .............................. 8275/74

[52] U.S. Cl. ................................ 246/387; 246/391; 246/392; 246/415 R

[51] Int. Cl.[2] ............................................ E01B 7/00

[58] Field of Search ................ 246/415 R, 427, 382, 246/391, 392, 387, 389; 104/130, 132

[56] References Cited

UNITED STATES PATENTS 719,461 2/1903 Green ................................ 246/391

*Primary Examiner*—Stephen G. Kunin
*Assistant Examiner*—Reinhard J. Eisenzopf
*Attorney, Agent, or Firm*—Cushman, Darby & Cushman

[57] ABSTRACT

Railway switch for Vignoles rails, comprising a frog tip and wing rails arranged for swivelling movement, each of the wing rails engaging the frog tip in a respective end position and being supported in this position by supporting members resting against the railway sleepers, the movement of the supporting members and the movement of the wing rails being effected in mutual dependence, the supporting members being guided in longitudinal direction of the corresponding wing rails by guide members on the railway sleepers and the supporting members cooperating with abutments protruding from the wing rails and fixed to the web of the wing rails.

8 Claims, 6 Drawing Figures

1
2
3
4
5
6
7
8
9
9'
10
10'
11
12
13
14
15
16
17
39

6
10
19
20
21
23
24
25
27
28
29
35
39
40
42
44
45
46
47
48
50
51
56
57
59

9
10
22
28
20
23
18
21
19
26
27
9'
10'
14
15
12
13

20
23
25
27
22
24
19
21
10
9
24
18
28
26
25
23

51
40
53
10
60
6
60
9
52
51

RAILWAY SWITCH FOR VIGNOLES RAILS

Railway switches for Vignoles rails comprise a so-called frog which is essentially composed of a frog tip, of two connecting rails adjoining said frog tip and of two wing rails leading to this frog tip. In embodiments of this type of railway switches having the wing rails stationarily arranged, an interruption of the running edge is existing at the area of the frog tip and is impairing the comfort of passengers. For forcing the set of wheels in the desired direction of travelling and for avoiding damaging the frog tip, so-called wheel guides are arranged at the outer rails, said wheel guides acting on that side of the wheel flanges which is remote from the rail for drawing the set of wheels away from the frog tip. Thus, such wheel guides have, particularly with high travelling velocities, as an effect a laternal jerk and thus are further detracting from the comfort of passengers.

For avoiding such an interruption of thhe running edge it has already been proposed to movably arrange the wing rails such that one of the wing rails is being brought into engagement with the frog tip and the other of the wing rails is being disengaged from the frog tip. Such wing rails, which are locked in its position engaging the frog tip by means of a locking device, are acted upon by the flanges of the wheels running on the respective wing rail in the sense of disengaging from the frog tip, noting that the area between the frog tip and the point of fixation of the movable wing rail is susceptible to lateral forces. For counteracting such laterally acting forces wheel guides can be provided also in this case, however, such wheel guides still have the disadvantages mentioned. It is further known to support in direction to the rail axis movable wing rails in their end position, in which they are engaging the frog tip, by supporting members connected with the railway sleepers. In this known embodiment, the supporting members are simultaneously acting as switching device for the wing rail. In this case, the supporting members are given the shape of wedges arranged for being shifted in longitudinal direction of the rail and for bringing into engagement the wing rail and the frog tip. Such a construction requires high adjusting forces in view of the great sliding surfaces which cannot be reliably lubricated. With increasing wear the wing rail will not reliably contact the frog tip and the wing rail will be insufficiently secured in its engaging position. Such constructions thus have not proved and are furthermore not fulfilling the requirements of moder traffic. It is still further known to provide such movable supporting members in addition to a switching device for the wing rails and to use these supporting members for laterally supporting the wing rails which have been brought into their engaging position by means of the switching device. With this known construction the movable supporting members are formed of levers pivotally supported on the railway sleepers and mutually interconnected by means of rods and laterally supporting the wing rails in their operating position in which they are acting against the rail web. Such supporting members have to be provided over the whole area between frog tip and point of fixation of the wing rail, which results in a relatively great rod length. The respective pivotable levers must assume a precise position in their supporting position and such a precise position cannot be warranted in any case in view of the occurring temperature changes so that the supporting action is not reliable enough. In view of the supporting action being only provided in a precise pivoted position of the pivotal levers and in view of the fact that the pivotal levers can be brought into this pivoted position only after having brought the corresponding wing rail into its final position engaging the frog tip, the movement of the supporting members must have a phase shift relative to the movement of the wing rail so that the control device for the supporting members becomes quite complicated. Furthermore, such pivotal levers and their pivotal bearings cannot be relied upon for counteracting high laterally acting forces.

The present invention refers to such a railway switch for Vignoles rails comprising a frog tip and wing rails arranged for swivelling movement, one of said wing rails engaging the frog tip to its end position and being supported in this position in direction of engaging the frog tip by means of supporting members resting against the railway sleepers, noting that the movement of the supporting members and the movement of the wing rails is being effected in mutual dependence. The invention aims at avoiding the disadvantages of known arrangements of the type indicated. The invention essentially consists in that the supporting members are guided on the railway sleepers in longitudinal direction of the corresponding wing rails and are cooperating with abutments protruding from the wing rails, preferably fixed to the web of the wing rails. In view of the supporting members being guided on the sleepers in longitudinal direction of the wing rail, any heat dilatation will be effective only over the short distance between the guide means for the supporting memebers and the wing rail and such a heat dilatation can be neglected. By guiding the supporting members in longitudinal direction of the wing rail it becomes superfluous to actuate these members with an exact phase shift. These supporting members can be shifted along a path of travel of any desired length prior to engaging the abutments provided on the wing rail and can, after having been brought into engagement with said abutments, be further shifted along a path of travel of any desired length without influencing the supporting effect. The arrangement according to the invention provides the advantage of increased precision and of more simple actuation and provides the possibility of neglect any changes of the length of all constructional parts on temperature changes, because the supporting members are arranged in longitudinal direction of the wing rails and any heat dilatations become effective in the same sense of both, the wing rails and the supporting members.

According to a preferred embodiment of the invention, each supporting member is formed of a supporting rod cooperating with one wing rail, said supporting rod comprising in addition to the supporting surfaces serving the supporting purpose, recesses for giving free the abutments of the wing rails. In this manner, all supporting surfaces associated with one wing rail are combined to one single constructional part, and all such constructional parts can reliably and in a simple manner be guided on the railway sleepers so that their operation will not be subjected to disturbances. The recesses conveniently extend over such a length of the supporting rod which is greater than the width of the abutments as measured in longitudinal direction of the wing rail, which provides again the advantage that any exact phase shift of actuating these supporting members relative to the wing rails is superfluous. The supporting members can, according to this invention, be coupled to the actuating rod for switching the railway switch by means of crank levers having a stationary pivotal axis.

With railway switches for Vignoles rails a supervising system is provided as a precautionary measure. This supervising system consists of a supervising rod being coupled to the wing rails and actuating corresponding signal switches in its respective end position. By coupling such a supervising rod only with the wing rails, only the correct position of the wing rail will be signalized but not the function of the supporting members. Now, according to the invention, this supervising rod is not only coupled to the wing rails but also to the supporting members for controlling the correct position of the supporting members. In those cases, in which the supporting members for each wing rail are, according to the invention, formed of one single supporting rod having the corresponding recesses, it is, in view of the supervising system also controlling the position of this supporting rod, made quite sure that, when the railway switch is being travelled upon, not only the wing rails but also the corresponding supporting rods are assuming their correct position. This is of particular importance with high travelling speeds because with a support not properly functioning, any lateral deformation of the wing rail may cause the train to run off the rails. Simultaneous supervision of the position of the wing rail and of the supporting members can, according to the invention, be effected by pivotally connecting the supervising rod to a central area of wings, one end of said wings acting on a wing rail and the other end of said wings acting on the supporting members associated with said wing rail. Such wings assume their precise correct position only in that case in which both acting areas at the ends of the wing assume their correct position, and it is only in this case that the supervising rod is in the position to actuate the corresponding signal switches. According to an advantageous embodiment of the invention the arrangement is such that the end, engaging the wing rail, of the wings is connected with the associated wing rail via a joint flap and in that the end, engaging the support members, of each wing is pivotally connected with the supporting rod, forming the support members, if desired with interposition of an intermediate member of adjustable length and independent from the control device of the supporting rods by means of a crank lever pivoted on stationary bearings and being provided in addition to the crank levers serving as control drive for the supporting rod. By providing separate crank levers for the supervising system and in view of the optionally provided intermediate member of adjustable length being independent from the control drive for the supporting rod, the possibility is provided to directly check the position of the supporting rods and to completely avoid errors which might result on failure, e.g. on rupture, of connecting links provided in the control drive. According to the invention, the supporting members formed of said rods can be connected with the associated crank levers via such length-adjustable intermediate members.

The invention is further illustrated with reference to the drawing showing as embodiment of a railway switch according to the present invention.

FIG. 1 represents schematically a securely operable railway switch for Vignoles rails with the details for supporting and actuating the switch being omitted.

FIGS. 2*a* and 2*b* each represent a top plan view of part of the railway switch for Vignoles rails, noting that FIG. 2*a* is representing a top plan view of the frog tip and FIG. 2*b* represents the top plan view of that part which continues the left-hand part of FIG. 2*a*.

Figure 1:
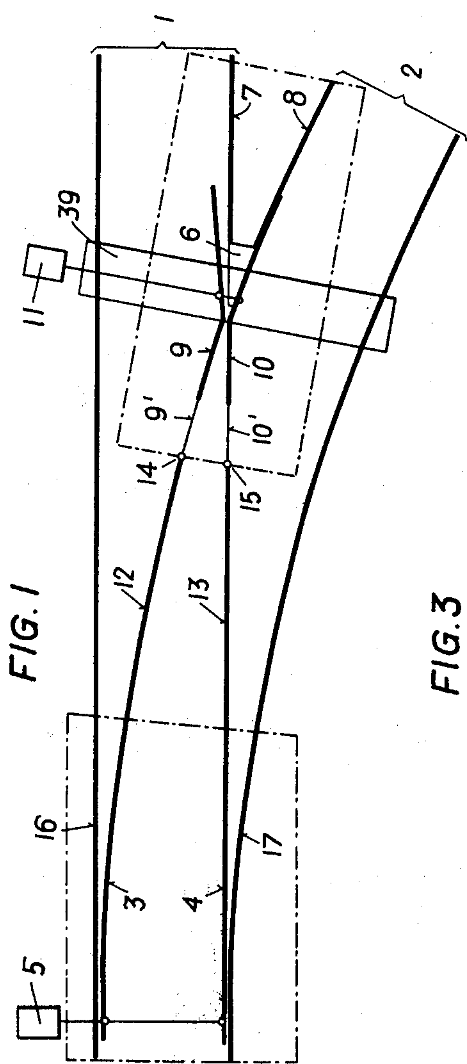
Figure 3:
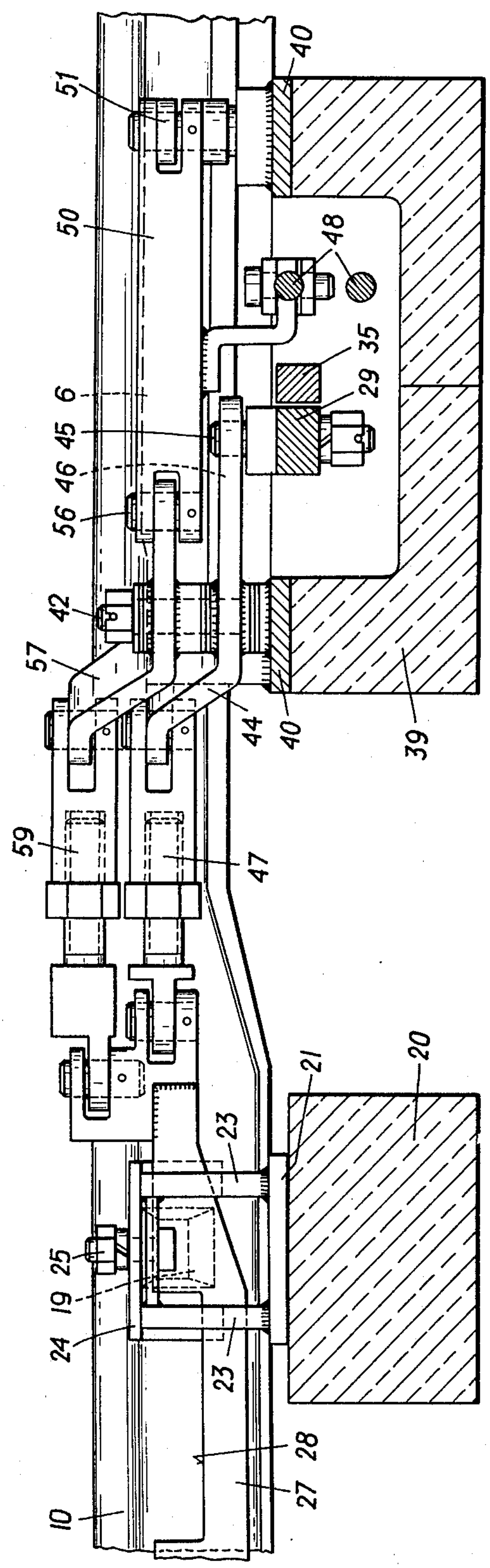
FIG. 3 represents a section along line III—III of FIG. 2*a*.

In FIG. 1 the main rail track is designated 1 and the branch railtrack is designated 2. The tongue rails are designated 3 and 4 and allow, in dependence on their position, the main rail track 1 or the branch rail track 2 to be travelled upon. The setting device for the tongue rail is schematically represented at 5. The frog tip is designated 6. The connecting rails 7 and 8 are joined to said frog tip. The wing rails are designated 9 and 10. In the representation of FIG. 1 the straight wing rail 10 is shown in its position engaging the frog tip 6, i.e. the position for travelling on the main rail track, while the bent wing rail 9 is shown in its position moved off the frog tip. The actuating device for actuating the wing rails 9 and 10 is designated 11. The wing rail 9 is connected with the tongue rail 3 via an intermediate rail 12 and the wing rail 10 is connected with the tongue rail 4 via an intermediate rail 13. At the transition areas 14 and 15 between wing rail 9 and the intermediate rail 12 on the one hand and between wing rail 10 and the intermediate rail 13 on the other hand, the wing rails are rigidly connected to the railway sleepers. The rail foot of the wing rails 9 and 10 is planed off at the areas 9' and 10' being located adjacent said areas of transition 14 and 15, so that the wing rails can be elastically bent in lateral direction.

The tongue rail 3 or 4 just being travelled upon is being pressed against the associated stock rail by the pressure of the wheel flange. Any supporting members are thus superfluous at this location. However, the wing rail 9 or 10 just being travelled upon is pressed off the frog tip 6 by the pressure exerted by the wheel flanges. To absorb this load, supporting members are provided.

These supporting members are shown in FIGS. 2*a*, 2*b*, 3 and 4. Abutments 18 are screwed or riveted to the rail web of the wing rail 9. Abutments 19 are riveted or screwed to the rail web of wing rail 10. Base plates 21 are screwedly connected to the railway sleepers 20 and guide means 22 are fixed to these base plates. Said guide means 22 consist of two edgewisely placed and mutually connected pieces 23 of sheet metal, which are welded with the base plates 21, and of a cover plate 24 which is screwedly connected with the pieces 23 of sheet metal by means of a screw 25. Supporting rods 26 and 27 are guided within these guide means 22 and are thus arranged for being shifted in longitudinal direction of the associated wing rails 9 and 10. Said supporting rods 26 and 27 comprise recesses 28.

Figure 2A:
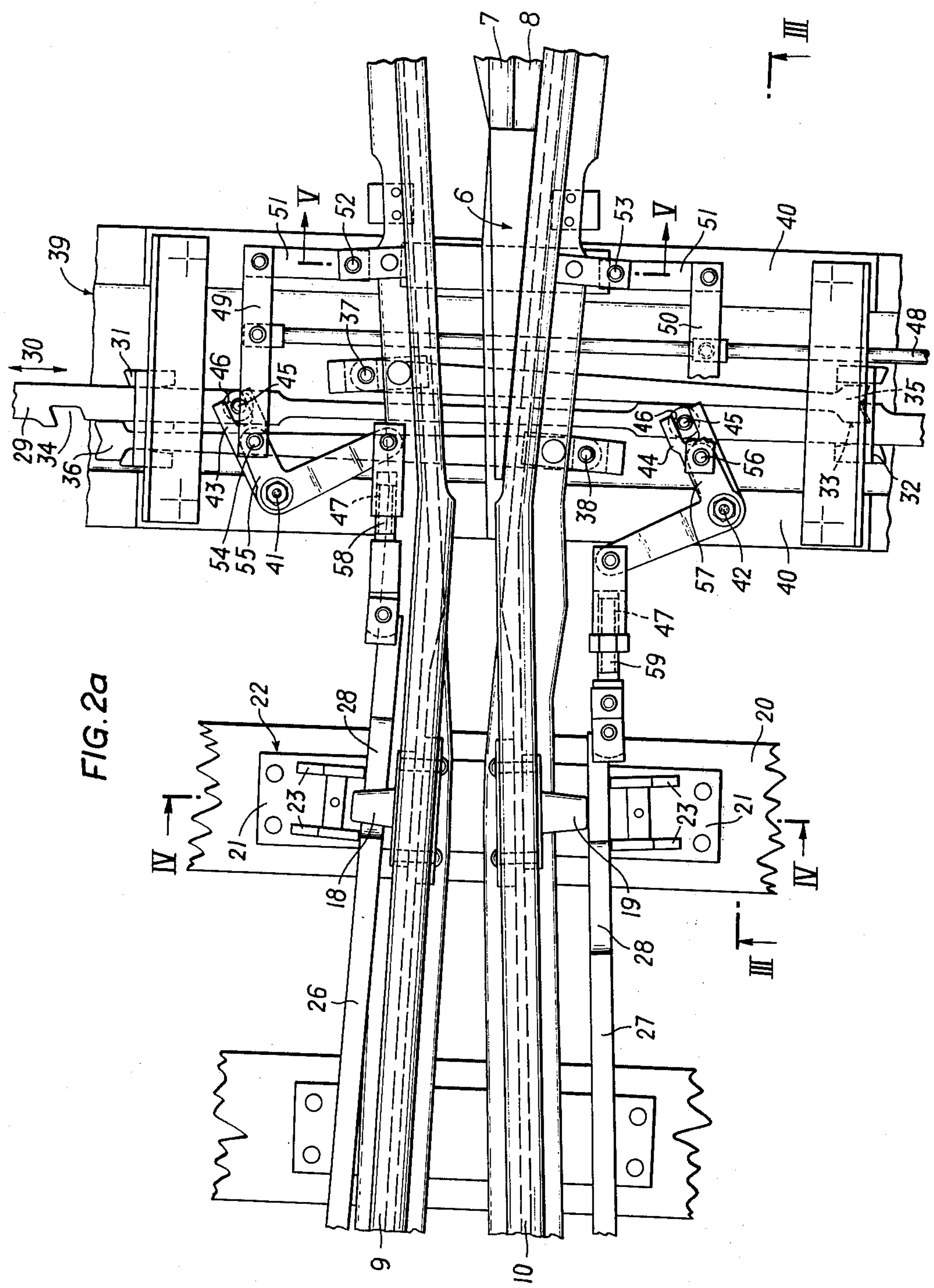
Figure 2B:
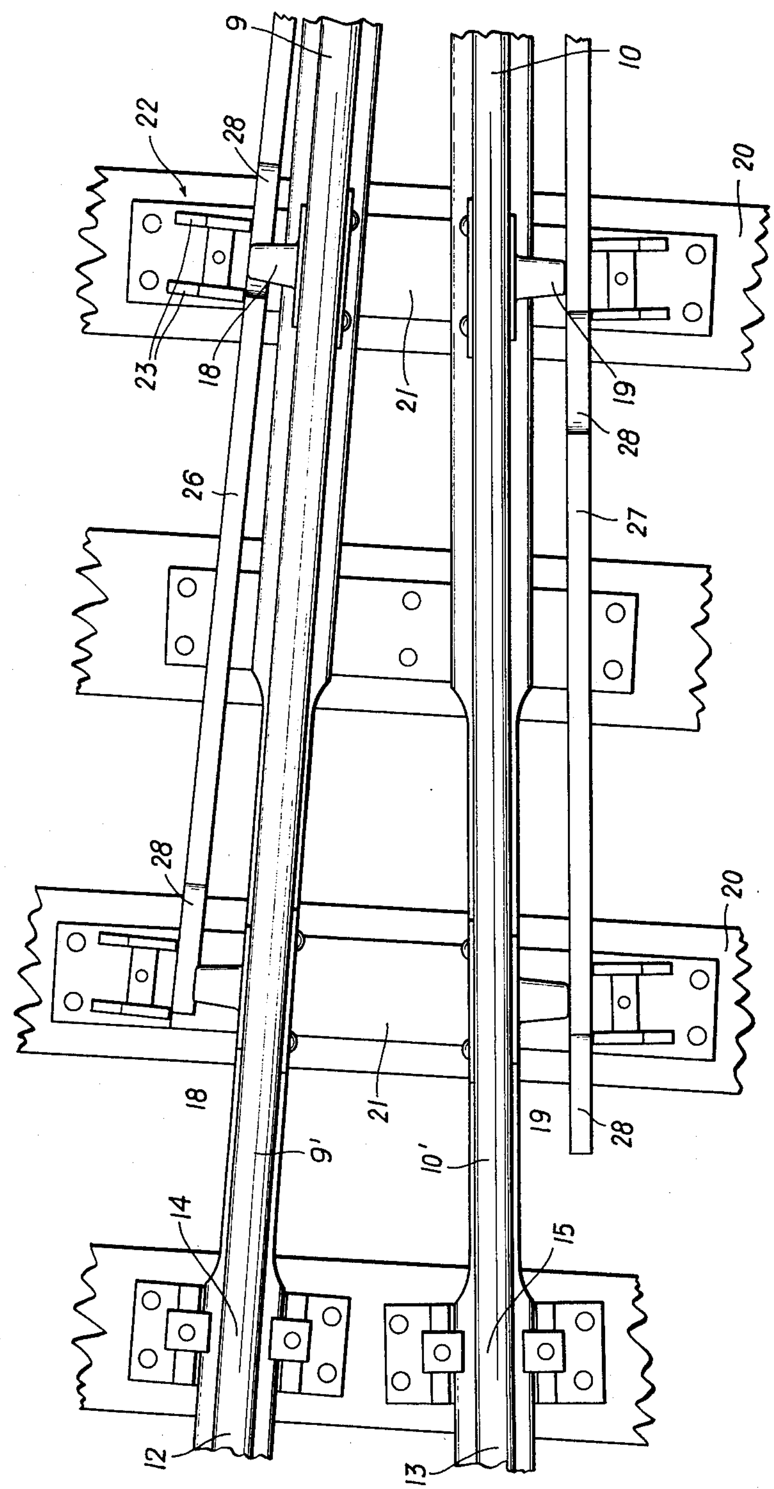

In the representation shown in FIGS. 2*a* and 2*b*, the wing rail 10 is engaging the frog tip 6, while the wing rail 9 is moved off this frog tip. In this position, the abutment 19 of the wing rail 10 are contacting the supporting rod 27 so that the wing rail 10 is supported in a direction to engage the frog tip 6. In this position the supporting rod 27 is shifted in its left-hand end-position. The supporting rod 26 is assuming its right-hand end-position. The abutments 18 of the wing rail 9 may thus enter the recesses 28 so that these abutments are given free by the supporting rod 26 and the wing rail is being moved off the frog tip. The rail bases of the wing rail 9 and of the wing rail 10 are, at the respective areas 90' and 10', planed off, so that these wing rails can be elastically bent in lateral direction and can thus be brought in the different positions relative to the frog tip 6.

Adjustment of the wing rails 9 and 10 is effected by means of a modified clamp lock device. This clamp lock device comprises a push rod 29 which is slidably supported in lock components 31 and 32. This push rod 29 comprises recesses 33 and 34 into which clamps 35, 36 may enter. Clamp 35 is pivotally connected at 37 to the wing rail 9 while clamp 36 is pivotally connected at 38 to the wing rail 10. With the push rod 29 shifted in upward direction, based on the representation shown in FIG. 2*a*, clamp 35 is located within the lock component 32 and thus secured in position so that the wing rail 9 is kept distant from the frog tip 6. Under this condition, clamp 36 is located above the lock component 31 and thus pulling the wing rail 10 into engagement with the frog tip 6. When shifting the push rod 29 in downward direction, based on the representation shown in FIG. 2*a*, clamp 35 is being pulled first in downward direction until the clamp leaves the lock component 32 so that the wing rail 9 will come into engagement with the frog tip 6. Meanwhile, clamp 37 does enter the recess 34 of push rod 29 and will then maintained in this position when being shifted into the lock component 31, so that the wing rail 10 is being lifted off the frog tip.

Joint pins 41, 42 are fixed to steel plates 40 connected to the railway sleeper 39 which has the shape of a trough sleeper. Crank levers 43 and 44 are pivotable on these joint pins. These crank levers are, on the one hand, acting by means of a bifurcated end 46 on bolts 45 fixed to push rod 29 and, on the other hand, acting with interposition of a length-adjustable intermediate member 47 on the supporting rods 26 and 27 in a pivotable manner. In this manner, by shifting the push rod 29, the supporting rods 26, 27 are simultaneously being shifted in correspondence with the transmission ratio of the crank levers 43 and 44, noting that said supporting rods 26 and 27 are supporting the wing rail just engaging the frog tip (shifting movement in left-hand direction) or are giving free the abutments 18 and 19, respectively, of the wing rail not engaging the frog tip for entering into the recesses 28. As is shown in the drawing, the recesses 28 have a length being greater than the width of the abutments 18 and 19 as measured in longitudinal direction of the wing rail, so that shifting movement of the supporting rods 26 and 27 can continuously be effected over the whole adjustment path of push rod 29. Shifting movement of the push rods 26 and 27 is in correspondence with the predetermined operating sequence of the wing rails.

Figure 4:
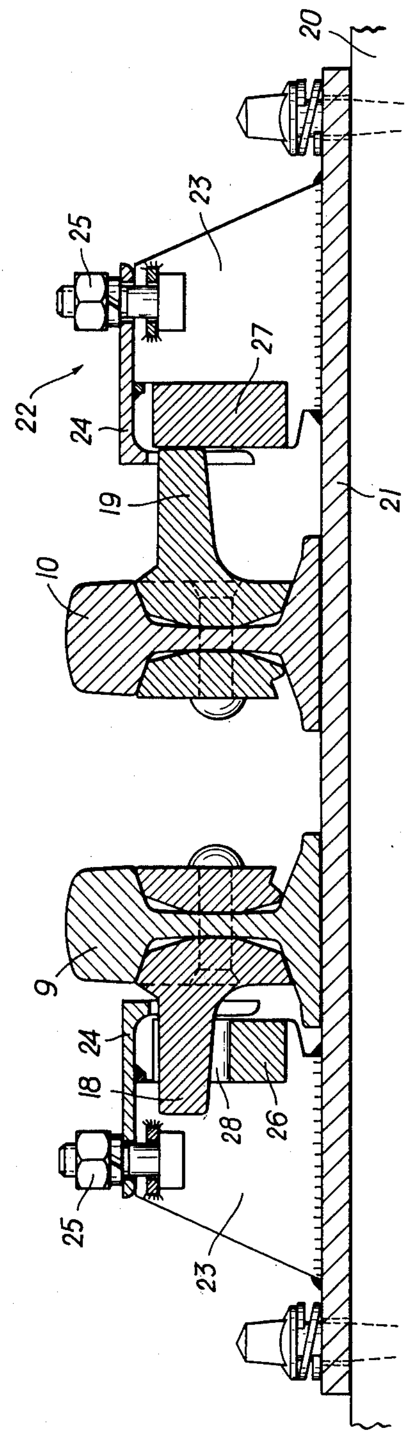
FIG. 4 represents a section along line IV—IV of FIG. 2*a*.

FIG. 4 shows how the abutments 18 riveted to the wing rail 9 will enter the recesses 28 (the wing rail 9 is moved off the frog tip) while the abutments 19 of the wing rail 10 are being supported against the push rod 27 (the wing rail 10 is engaging the frog tip 6).

48 is a supervising rod which is to actuate the signals when a selected wing rail 9 or 10 is engaging the frog tip while the other wing rail is moved off the frog tip 6 for correctly signalizing the position of the railway switch. This supervising rod is pivotally connected to the central portion of the two wings 49 and 50. The right-hand end of wing 49 is pivotally connected at 53 to the wing rail 10 by means of a joint flap 51. The left-hand end of wing 49 is pivotally connected by means of a joint pin 54 to a crank lever 55 which is arranged for being swivelled around the stationary axis 41. The left-hand end of wing 50 is pivotally connected by means of a joint pin 56 to a crank lever 57 which is arranged for being swivelled around the axis 42. The other arm of this crank lever 55 is pivotally connected to the supporting rod 26 via a length-adjustable intermediate member 58 while the other end of the crank lever 57 is equally pivotally connected to the supporting rod 27 via a length-adjustable intermediate member 59. The supervising rod 48 may assume its correct switching position only if both arms of both wings 49 and 50 assume their correct position, so that the correct position of the wing rails 9, 10 (via the flaps 51) on the one hand and the correct position of the supporting rods 26 and 27 (via the crank levers 55 and 57) can simultaneously be controlled.

Figure 5:
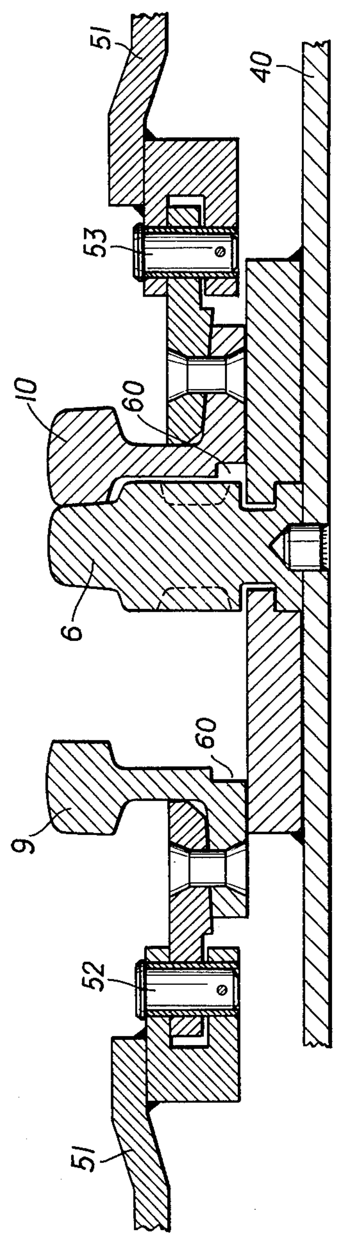
FIG. 5 represents a section along line V—V of FIG. 2*a*.

The recesses 60, which are provided at the base of the wing rails 9 and 10 as shown in FIG. 5, serve for mounting an electrical heating equipment for the railway switch.

What we claim is:

1. In a railway switch for Vignoles rails, comprising a frog tip and wing rails fixed at one point and arranged for swivelling movement, each of said wing rails being moveable to an end position in which it engages the frog tip, means for shifting said wing rails to said end positions and additonal separate means supported against the railway sleepers and supporting each of said wing rails in its respective end position, said additional means including for each wing rail a supporting rod extending over the distance between said shifting means and the point of fixation of the respective wing rail to a sleeper and being guided in a longitudinal direction of the corresponding wing rail by means of fixed guide members each of said supporting rods having supporting surfaces cooperating with a plurality of abutments fixed to and protruding from the web of the respective wing rail whereby the support by said supporting rods is provided in a direction which brings one of the said wing rails into engagement with the frog tip, each of said supporting rods having recesses for receiving the abutments of the respective wing rail when the latter is in engagement with the frog tip, said means for shifting the wing rails being coupled to said additional means for supporting the wing rails for movement in mutual dependence.

2. A railway switch as in claim 1 wherein the recesses extend over a longitudinal range of the respective supporting rod which is greater than the width of the abutments as measured in the longitudinal direction of the respective wing rail.

3. A railway switch as in claim 1 wherein said shifting means includes push rods extending generally transverse to the wing rails and crank levers pivotally supported in stationary bearings, said crank levers being interconnected between the push rods and the supporting rods.

4. A railway switch as in claim 3 including length-adjusting members connected between the crank levers and the supporting rods.

5. A railway switch as in claim 3 wherein the crank levers are connected via bifurcated ends on bolts fixed to the push rods.

6. A railway switch as in claim 1 including supervising rods acting on the wing rails and on the supporting rods.

7. A railway switch as in claim 6 including a wing associated with each supervising rod and pivotally connected thereto at a location intermediate the ends of the wing, one end of each wing acting on one wing rail and the other end of each wing acting on the supporting rods associated with this wing rail.

8. A railway switch as in claim 6 wherein that end of the wing which is acting on said one wing rail is connected with the associated wing rail via a joint flap and wherein that end of the wing which is engaging the supporting rod of the respective wing rail is pivotally connected with the supporting rod by means of a stationarily pivoted crank lever.

* * * * *